United States Patent [19]

Grindrod et al.

[11] Patent Number: 4,944,134
[45] Date of Patent: Jul. 31, 1990

[54] METHOD OF FORMING A RECLOSABLE PACKAGE

[75] Inventors: Paul E. Grindrod, Madison; Gerald O. Hustad, McFarland, both of Wis.

[73] Assignee: Oscar Mayer Foods Corporation, Madison, Wis.

[21] Appl. No.: 305,876

[22] Filed: Feb. 2, 1989

[51] Int. Cl.⁵ .................. B65B 7/02; B65B 31/02; B65D 73/00
[52] U.S. Cl. .................................. 53/432; 53/436; 53/478; 53/486; 206/459
[58] Field of Search ............... 53/432, 433, 436, 478, 53/486, 487, 488, 489; 206/459, 461, 467, 471; 220/306, 307

[56] References Cited

U.S. PATENT DOCUMENTS

| 3,420,397 | 1/1969 | Miller | 220/307 |
| 3,454,158 | 7/1969 | Tigner | 206/471 |
| 3,460,711 | 8/1969 | Al-Roy | 220/307 |
| 3,498,018 | 3/1970 | Seiferth et al. | 53/433 |
| 3,734,276 | 5/1973 | Bank | 206/497 X |
| 3,792,181 | 2/1974 | Mahaffy et al. | 220/307 X |
| 4,498,588 | 2/1985 | Scott | 206/526 |
| 4,498,589 | 2/1985 | Scott et al. | 206/526 |
| 4,688,369 | 8/1987 | Cornish et al. | 53/436 |
| 4,741,452 | 5/1988 | Holzkopf | 220/306 |

Primary Examiner—Robert L. Spruill
Assistant Examiner—Beth Bianca
Attorney, Agent, or Firm—Joseph T. Harcarik

[57] ABSTRACT

This invention pertains to a reclosable package having a body member, a base, hermetic seal between the body member and base and snap-locking projections formed in the side walls of the body member and base.

24 Claims, 1 Drawing Sheet

METHOD OF FORMING A RECLOSABLE PACKAGE

BACKGROUND OF THE INVENTION

1. Field of the Invention

This invention pertains to a food package having a base, a body member, a peelable seal for hermetically sealing the base to the cover and a snap-locking means formed in the base and cover for reclosing the package after it has been opened and providing an audible snap as the package is reclosed.

2. Description of the Prior Art

Food packages have been described in the past. For example, in U.S. Pat. No. 3,498,018, a food package is described wherein the food is sealed inside the package having a body and a top member. The food is formed under vacuum and with mechanical pressure, thereby forming the food to the package, and is hermetically sealed. These types of packages and methods for forming are further described in U.S. Pat. Nos. 4,411,122; 4,577,757; and 4,688,369. Attempts to improve these patents are further described in U.S. Pat. Nos. 4,498,588 and 4,498,589. Various improvements are described, for instance in U.S. Pat. No. 4,498,588, ridges 34, grooves 36, and FIG. 3 are described in an attempt to provide a interlocking engagement. These elements, however, have not proven to be satisfactory in producing a suitable audible snap in reclosing the package. Other means of incorporating snap actions into packages are described in U.S. Pat. Nos. 3,672,536; 3,734,276. It is submitted that these two patents, however, do not describe packages wherein the packaged foods are formed to the package with vacuum and mechanical pressure. Thus, there remains in the art a need for a package that is easily openable and also recloses in a positive manner in providing an audible sound signifying to the consumer that the package has been reclosed, particularly with packages where the food is pressed to conform to the container.

SUMMARY OF THE INVENTION

Figure 1:
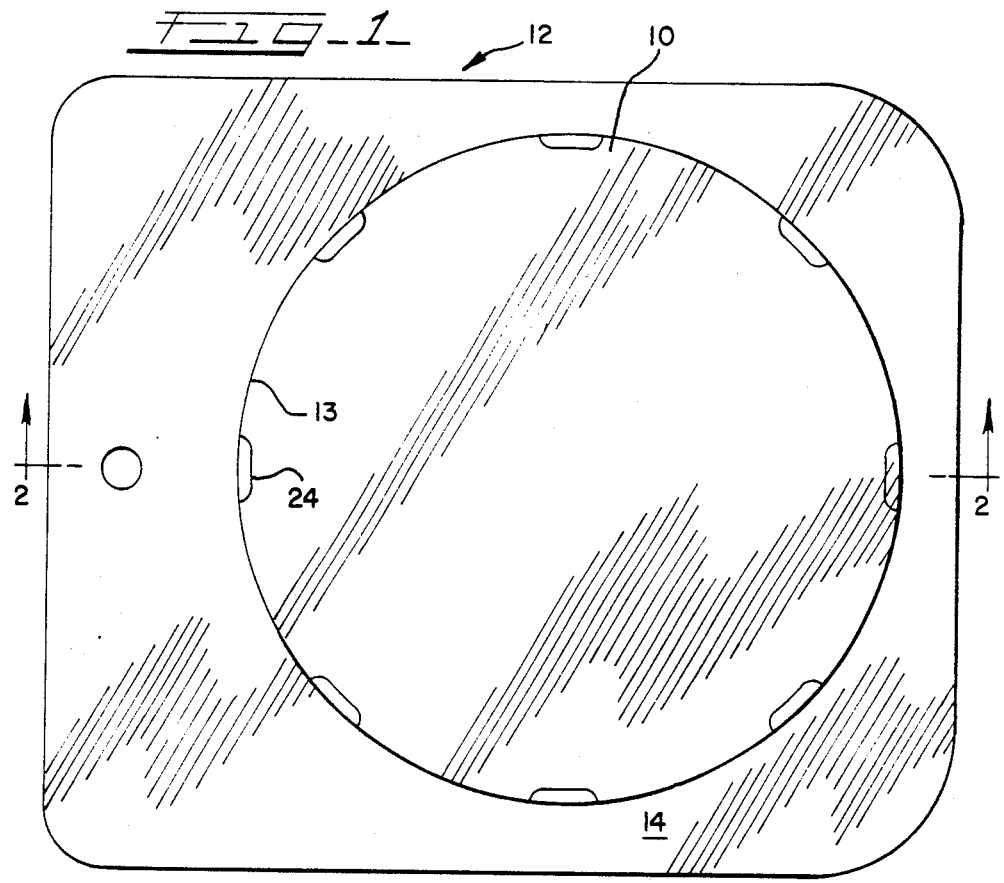
FIG. 1 is a bottom view of a package of the instant invention.
Figure 2:
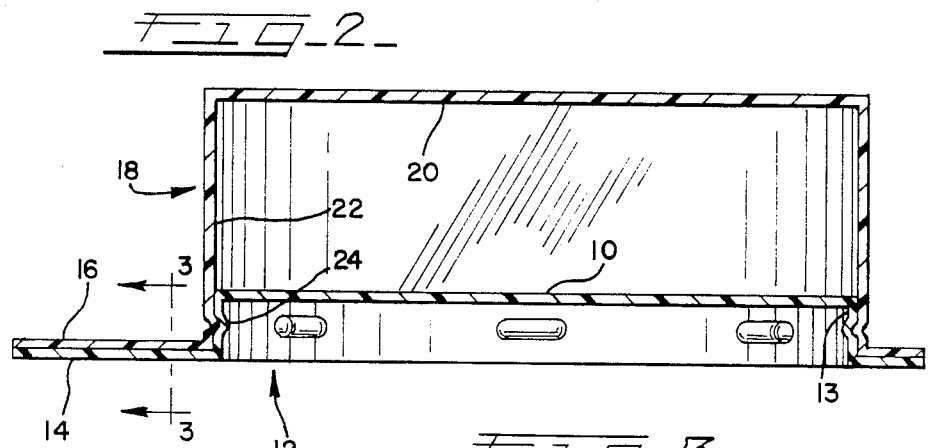
FIG. 2 is a side view of the package of the instant invention.
Figure 3:
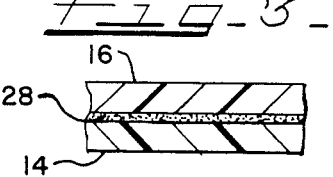
FIG. 3 is a segment of the package of the instant invention.

This invention pertains to a food package having a base with a peripheral flange, a side wall and a raised panel portion. A body member is also provided having a peripheral flange, a side wall and a top panel. Said body member cooperates with the base to form a cavity to receive a food product when said base side wall engages said bodY member side wall in telescoping arrangement of the packaged so that the food may be compressed. Suitable packaged foods include but are not limited to sliced luncheon meats and cheeses. A pealable sealing means is also provided to hermetically seal the body member flange to the base flange. A snap-locking means is primarily or totally postformed in the base side wall and in the body member side wall to provide an audible snap-locking action wherr the base engages the body member.

DETAILED DESCRIPTION OF THE INVENTION

U.S. Pat. Nos. 3,498,018; 4,411,122; 4,577,757; and 4,688,369 are herein incorporated by reference. These patents describe a method of forming a vacuumized, hermetically sealed package, as shown in the figures, characterized by a pre-determined quantity of a product which is deformable and is arranged in a form of an upright mass of a raised panel (10) portion of a base (12). The base has a side wall (13) and peripheral flange (14), hermetically sealed to a corresponding peripheral flange (16) of a body member (18). Preferably, the body member is made of a semi-ridged, pre-formed plastic. The body member has a top panel (20) for engaging the upper end of the product and a depending side wall (22) for engaging the side walls of said product. A hinge may also be provided by affixing base (12) to body flange (16) at either end of the package. A glue pattern of adhesives (28) are applied around the periphery of the package and form an hermetic peel seal. The peel seal may be formed by other means such as using dissimilar materials. The bottom edges of the body member side wall are in telescoping relation with the portion of the base at the peripheral edges of said raised panel portion. To fill the package, the body member is placed in an inverted position and a sufficient quantitY of product is placed in said body member to substantially fill the body member when the package is completed. The base is positioned on the mouth of the body member so that the product panel disposes in a telescopic way into the body member and engages the product. The flange margins of the base overlay the corresponding margins of the body member. Mechanical pressure is applied inwardly on the outside surface of the raised panel portion. The area defined by the bottom edges of the body side walls is sufficient to force the product into close contact with the interior surfaces of the base and body members to shape the product to conform to the shape of the interior surface and to substantially completely fill the space available between the package and product while vacuumizing the assembly and the sealing of the package by hermetic means.

According to the present invention, lugs (24), rings or other frictional interference-tYPe geometric shapes in the package is solid-state formed by an appropriate shaped device primarily or totally after the package has been thermoformed. The postforming lugs provide a snap-type, audible opening and reclosure. Postforming, alone or with thermoforming, is important because a sharply defined or articulated lug or ring of sufficient depth cannot be made in a multiple die because the article cannot be easily removed from the die without resorting to complex split dies which increase both capital investment a nd material usage. Further, postforming at temperatures below the melting point range, but above the glass transition temperature of the plastic, is important in making a deep enough lug with sharply defined edges and corners which are required to maximize the audible snap as the package is opened and reclosed.

It is believed that postforming alone or with thermoforming is preferred to cold forming or thermoforming to develop a suitable interference device (lug) that makes a sharp snap in opening and reclosure. The lug or interference device can be made by postforming both halves of a sealed package containing food, or postforming one or both of the package parts after thermoforming but before sealing.

Both halves of the package can be made, for example, of a stiff plastic-like Barex. If the finished package is postformed, it is preferable to coat one of the Barex components with a on-sealing material to prevent fusion of the two package halves during postforming. The package can also be made of two different and preferably stiff plastics like Barex and PVC. A non-sealing coating is not required for dissimilar materials.

On a typical plastic meat (food) package composed of a thermoformed body and a base, lugs are thermoformed into each of the two package halves to provide a snap-type reclosure. In large volume thermoforming, the sharpness and depth of these lugs has been minimized so that the thermoformed parts can be easily rejected from a thermoforming mold. Sharply formed lugs with a definitive undercut cannot be released from a multiple part mold without making a split mold. A split mold becomes impractically complicated and expensive for multiple units. Similarly, the material costs rise unacceptably as more space is provided for release mechanisms between multiple packages.

The method of solid-state forming at an elevated temperature below the melting range of the plastic, circumvents the problems inherent in both thermoforming onlY and cold forming. The method of locally heating the lug area to permit articulate forming below the melting range of the plastic, permits the plastic adjacent to the lug to remain dimensionally stable and supportive of the warm mechanical lug-forming operation.

Further, the use of the stiffest plastic appropriate for the package increases the snap action of the lugs. A Barex-Barex combination appears to provide the best snap action.

Additionally, simultaneous solid-state forming of coated Barex male and female lugs in a finished package generates a nearly perfect fit between the male and female lug. This precision fit improves snap action.

The use of solid-state forming permits the formation of precisely matching male and female lugs without excessive thinning of the plastic. The use of a seal inhibitor on one of the lug mating surfaces permits simultaneous forming of male and female lugs which are both made of the stiffest appropriate material. Alternatively, dissimilar materials of sufficient stiffness can be formed simultaneously without sticking.

It is believed that solid-state forming at or slightlY above the glass transition temperature eliminates the problem of cold forming or thermoforming only. For example, the glass transition temperature of Barex is 203° F, with a melting point of 275° F. As the temperature approaches the glass transition temperature, the forces between the molecules diminish to permit restricted internal movement of the plastic in forming. This restricted plasticity it is believed permits the formation of geometric shapes with sharp definition against a heated aluminum shoe at approximately 200° F in the case of Barex.

It is further believed that the sharp geometry increased depth of a male lug, for example, results in better audibility on opening and reclosure. The snap of a lug, or lug and ring system, is the result of an interference fit in opening and reclosure where the package components store and release energy as they are distorted, stressed and subsequently relaxed.

The rate of relaxation after stress determines the energy flow and, in effect, the power release that is partially converted into an output of acoustic energy. Thus, a sharply defined lug or lug/ring system made possible by solid-state forming increases the instantaneous power surge available for conversion to acoustic energy.

It is believed that solid-state forming makes a better audible opening/reclose communication to the consumer, because more power is released during a shorter time interval with greater conversion to acoustic energy.

This invention works, as shown in the Figures, by the interlocking of the lugs, or lugs and ring, or rings formed around the vertical surface of the base with the companion lugs or ring in the vertical wall of the body.

These lugs may vary in number from 3 to 24 and they may be intermittent or a continuous bead. The lugs are formed in the filled, fully-sealed package by inserting an aluminum shoe approximately ⅜" wide × 1/16" thick about 1/16 to ⅛" into the wall of the body at a temperature between 180° and 220° F for Barex. This heated aluminum shoe solid state forms a lug into the wall of the bubble adjacent to the flange area of the bubble. The lug protrudes from the bubble wall into the vertical base wall to make a precise female replication of the male lug.

Similarly, the lug may be formed from the vertical wall of the base outward into the wall of the body to form a lug protruding outward instead of inward.

Either the inner surface of the body or the outer mating surface of the vertical wall of the base should preferably be coated with a substance which will interfere with sealing between the bubble and the base if similar materials are used. These coatings respectively are a saran coating and a polyester coating. Similarly, a nitro cellulose or cellulose butyrate coating can be used. Additionally, a silicone release coating, can be applied, but care must be exercised to prevent contamination of adjoining surfaces because silicone interferes with subsequent adhesive seals.

We claim:

1. A method of forming a vacuumized, hermetically sealed package which is characterized by a predetermined quantity of a product which is deformable and is arranged in the form of an upright mass on a raised panel portion of a semi-rigid base, which base has peripherally extending flange margins sealed to corresponding flange margins of a body member of a semi-rigid preformed plastic; said body member having a top panel for engaging the upper end of said product and depending side walls for engaging the side walls of said product, and the bottom edges of said body side walls being in telescoping relationship wit portions of said base at the peripheral edges of said raised panel portion; said method comprising supporting said preformed body member in inverted position with the flanged margins thereof sealed on the edge portions of a rigid upwardly opening hollow form, placing a sufficient quantity of said product in said body member to substantially fill said body member when the package is completed, positioning said base on the mouth of said body member with said product engaging panel disposed so as to telescope into said body member and engage with said product and with the flanged margins of said base overlying the corresponding margins of said body member, applying mechanical pressure inwardly of the outside surface of said raised panel portion and within the area defined by the bottom edges of said body side wall sufficient to force said product into close contact with the interior surfaces of said base and body members so as to shape said product to conform to the shape of said interior surfaces and to substantially completely fill the space available between the same with a product while vacuumizing the assembly and hermetically sealing the package, wherein the package further contains a locking means contained in the base and body member side walls for snap locking the base to the body member, said locking means provides for friction interference fit, and postforming said locking means at temperatures below the melting point range but above about the glass transition temperature.

2. The method according to claim 1, wherein said postforming step forms said locking means in a plastic base and body member, and wherein said melting point range and glass transition temperature are in respect of said plastic.

3. The method according to claim 1, wherein said postforming step forms said locking means in a base and body member of a plastic selected from the group consisting of Barex and PVC, and wherein said melting point range and glass transition temperature are in respect of said plastic.

4. The method according to claim 1, wherein said postforming step includes forming said locking means with a formation means heated at a temperature between about 180° and 22° F.

5. The method according to claim 1, wherein said postforming step includes forming said locking means with an aluminum shoe heated at a temperature between about 180° and 220° F.

6. The method according to claim 1, wherein said postforming step includes solid-state forming of said locking means.

7. The method according to claim 1, wherein said postforming step forms said locking means from the side wall of the body member inwardly into the side wall of the base member.

8. The method according to claim 1, wherein said postforming step forms said locking means from the side wall of the base member outwardly into side wall of the body member.

9. The method according to claim 1, further including coating a substance onto at least a portion of said package at said locking means, said substance being one which interferes with sealing between said body member and base member.

10. The method according to claim 1, further including coating a substance onto at least a portion of said package at said locking means, said substance being selected from the groups consisting of a saran, a polyester, a nitro cellulose, a cellulose butyrate and a silicone.

11. A method of forming a vacuumized, hermetically sealed package which is characterized by a predetermined quantity of a product arrange dint eh from of an upright mass on a raised panel portion of a semi-rigid base, which base has peripherally extending flange margins sealed to corresponding flange margins of a body member of a semi-rigid preformed plastic; said body member having a top panel for engaging the upper end of said product and depending side walls for engaging the side walls of said product, and the bottom edges of said body side walls being in telescoping relationship with portions of said base at the peripheral edges of said raised panel portion; said method comprising supporting said preformed body member in inverted position with the flanged margins thereof on the edge portions of a rigid upwardly opening hollow form, placing a sufficient quantity of said product in said body member to substantially fill said body member when the package is completed, positioning said base on the mouth of said body member with said product engaging panel disposed so as to telescope into said body member and engage with said product and with the flanged margins of said base overlying the corresponding margins of said body member, vacuumizing the assembly and hermetically sealing the package, wherein the package further contains a locking means contained in the base and body member side walls for snap locking the base to the body member, said locking means provides for friction interference fit, and postforming said locking means at temperatures below the melting point range but above about the glass transition temperature.

12. The method according to claim 11, wherein said postforming step forms said locking means in a plastic base and body member, and wherein said melting point range and glass transition temperature are in respect of said plastic.

13. The method according to claim 11, wherein said postforming step forms said locking means in a base and body member of a plastic selected from the group consisting of Barex and PVC, and wherein said melting point range and glass transition temperature are in respect of said plastic.

14. The method according to claim 11, further including coating a substance onto at least a portion of said package at said locking means, said substance being one which interferes with sealing between said body member and base member.

15. The method according to claim 13, further including coating a substance onto at least a portion of said package at said locking means, said substance being one which interferes with sealing between said body member and base member.

16. The method according to claim 11, further including coating a substance onto at least a portion of said package at said locking means, said substance being selected from the groups consisting of a saran, a polyester, a nitro cellulose, a cellulose butyrate and a silicone.

17. The method according to claim 13, further including coating a substance onto at least a portion of said package at said locking means, said substance being selected from the groups consisting of a saran, a polyester, a nitro cellulose, a cellulose butyrate and a silicone.

18. The method according to claim 11, wherein said postforming step includes forming said locking means with a formaton means heated at a temperature between about 180° and 220° F.

19. The method according to claim 13, wherein said postforming step includes forming said locking means with a formation means heated at a temperature between about 180° and 220° F.

20. The method according to claim 11, wherein said postforming step includes forming said locking means with an aluminum shoe heated at a temperature between about 180° and 220° F.

21. The method according to claim 13, wherein said postforming step includes forming said locking means with an aluminum shoe heated at a temperature between about 180° and 220° F.

22. The method according to claim 11, wherein said postforming step includes solid-state forming of said locking means.

23. The method according to claim 11, wherein said postforming step forms said locking means from the side wall of the body member inwardly into the side wall of the base member.

24. The method according to claim 11, wherein said postforming step forms said locking means from the side wall of the base member outwardly into side wall of the body member.

* * * * *